United States Patent [19]

Mergelsberg

[11] Patent Number: 5,030,469

[45] Date of Patent: Jul. 9, 1991

[54] METHOD OF PRODUCING AN AERATED CONFECTIONERY FOAM FROM A SUGAR SOLUTION AND A FOAMING-PROMOTER SOLUTION BATCH BY BATCH

[75] Inventor: Reinhard Mergelsberg, Frielingen, Fed. Rep. of Germany

[73] Assignee: Otto Hansel GmbH, Hanover, Fed. Rep. of Germany

[21] Appl. No.: 419,772

[22] Filed: Oct. 11, 1989

[30] Foreign Application Priority Data

Jun. 2, 1989 [DE] Fed. Rep. of Germany ....... 3918051

[51] Int. Cl.[5] .......................... A23G 3/00; A23G 3/02

[52] U.S. Cl. ...................................... 426/564; 99/324; 99/348; 426/568; 426/571; 426/572; 426/660

[58] Field of Search ............... 426/564, 568, 571, 572, 426/660; 99/324, 348

[56] References Cited

FOREIGN PATENT DOCUMENTS 2178639 2/1987 United Kingdom .

OTHER PUBLICATIONS

Fennema, O. R., Food Chemistry, 1985, Marcel Dekker, Inc., p. 303.

Ehrlich, E. et al., Oxford American Dictionary, 1980, Oxford University Press, p. 766.

*Primary Examiner*—Donald E. Czaja

*Assistant Examiner*—Leslie Wood

*Attorney, Agent, or Firm*—Max Fogiel

[57] ABSTRACT

A method for producing an aerated confectionery foam from a sugar solution and a foam-promoting solution. The aerated confectionery foam is produced batch by batch using a boiler and a beater. The sugar solution is boiled in the boiler and transferred to the beater. The aerated confectionery foam is formed from the foam-promoting solution and the boiled sugar solution, and removed from the beater through pressure application. The foam-promoting solution is beaten in a vacuum either by itself or along with the boiled sugar solution. The pressure in the beater during the beating procedure is sub-atmospheric. The aerated confectionery foam is produced with small and finely distributed bubbles. The pressure during beating the foam-promoting solution differs from the pressure at which the aerated confectionery foam solidifies.

8 Claims, 1 Drawing Sheet

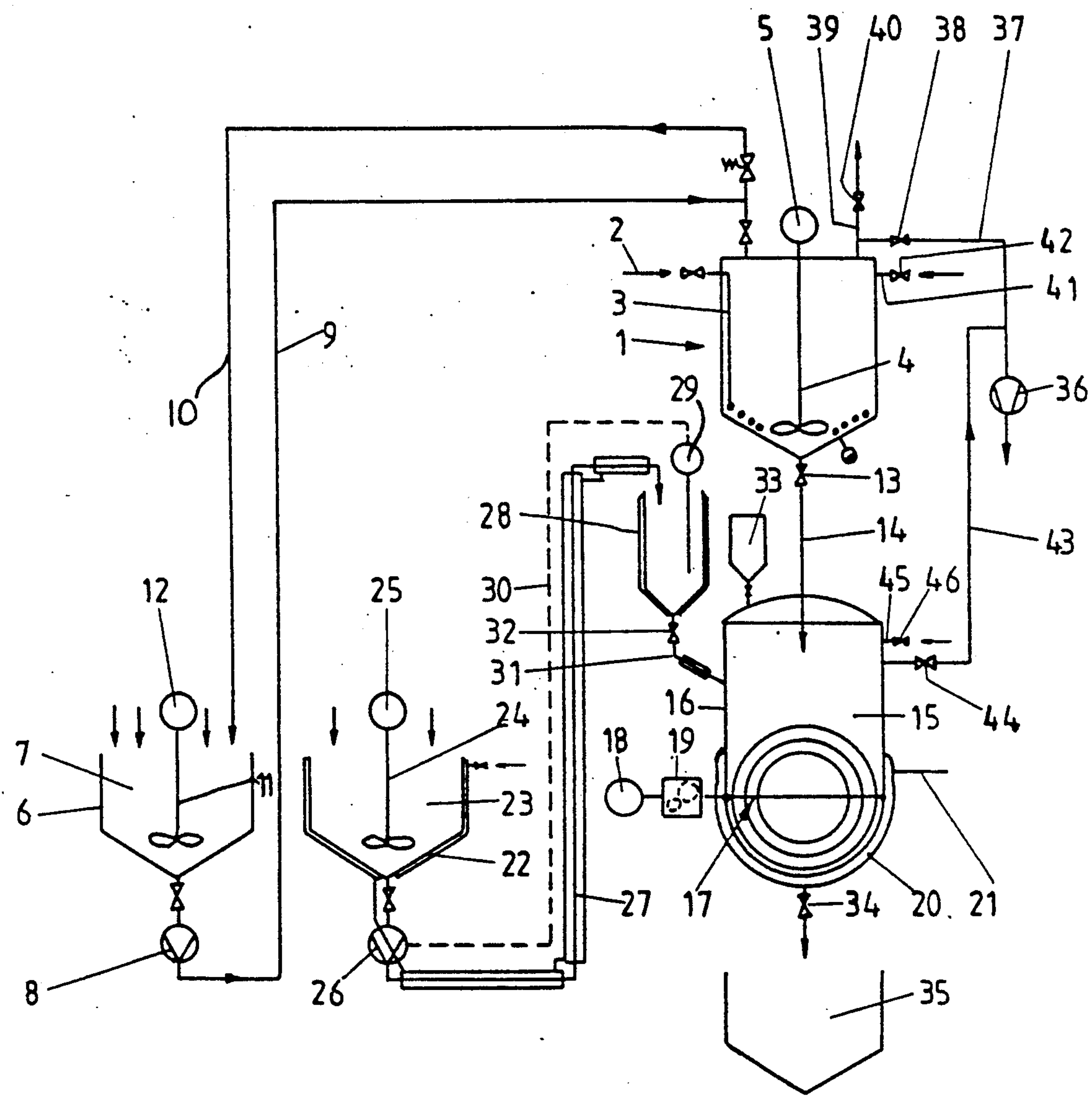
5
39
40
38
37
42
2
41
3
1
4
36
29
10
9
33
13
28
14
43
12
25
30
45
46
32
31
44
16
15
24
7
18
19
11
6
23
22
27
17
34
20
21
8
26
35

METHOD OF PRODUCING AN AERATED CONFECTIONERY FOAM FROM A SUGAR SOLUTION AND A FOAMING-PROMOTER SOLUTION BATCH BY BATCH

BACKGROUND OF THE INVENTION

The invention concerns a method of producing an aerated confectionery foam from a sugar solution and a foaming-promoter solution batch by batch with a boiler and a beater, wherein the sugar solution is boiled in the boiler and transferred to the beater and the aerated confectionery foam is created out of the foaming promoter and the boiled sugar solution and pressure-extracted from the beater. A sugar solution is a solution of sugar, glucose syrup, and other ingredients in water. Sugarless ingredients can also be employed as sugar solutions. A foaming-promoter solution is also a solution in water of such foaming promoters as egg white, gelatine, etc. The foaming-promoter solution can also contain some sugar solution or similar material. The same solution may include colorants, flavorings, etc.

A method of this type is known from German Patent 3 528 637. The boiling process can be carried out in the boiler under atmospheric pressure because the processing in the beater is carried out in a vacuum. The sugar solution, boiled under atmospheric pressure, is transferred to the beater and processed in a vacuum to reduce it to the requisite residual-water content and to a temperature desirable for future processing. Once the vacuum has been lifted, the foaming-promoter solution is added to the sugar solution in the beater. The two masses are then beaten together under atmospheric pressure or in a vacuum. Increased pressure is preferably introduced during the beating process in order to provide as much air as possible for working into the confectionery foam that forms during the beating process. The purpose of increasing the pressure is to induce the mass to expand later when it is extracted from the beater to obtain masses with a low specific gravity. The individual bubbles of air that are worked into the mass will of course expand in accordance with the drop in pressure. The drawback to this approach is that the foaming-promoter solution comes into contact with the hot sugar solution before the beating stage and coagulates prematurely, so that its contribution to producing the foam is reduced. The foaming capacity of the foaming-promoter solution is accordingly incompletely exploited.

Creating a preliminary foam in a beater without any sugar solution present is also known. The foaming-promoter solution is usually beaten under atmospheric pressure. The sugar solution can be boiled in the boiler under atmospheric pressure, subject to increased pressure, or in a vacuum. The boiled sugar solution is then added to the preliminary foam in the beater, under atmospheric pressure for practical purposes. The preliminary foam and the sugar solution are then mixed together and beaten again, with increased pressure being multiply employed with the objective of ensuring enough air during the beating process to expand the confectionery foam as it is extracted from the beater and hence obtaining the associated low specific gravity. The potentially desirable vacuum treatment of the confectionery foam after beating that would be expected to reduce its residual moisture content is impossible because the expansion of the mass that would then occur inside the beater would force some of it into the line and into the vacuum generator.

The bubbles worked into the mass and full of gas, preferably air, in all known methods of producing aerated confectionery foams are considered too large for many purposes. Especially when the aerated confectionery foam is released from increased to atmospheric pressure, the volume of each individual bubble can only be increased.

SUMMARY OF THE INVENTION

The object of the invention is to provide a method of producing an aerated confectionery foam from a sugar solution and a foaming-promoter solution batch by batch of the type initially described herein that will allow the introduction of a large number of bubbles that are as small as possible into the confectionery foam. What is primarily essential is the smallness of each resulting individual bubble and not a particular low specific gravity.

This object is attained in that the foaming-promoter solution is beaten under sub-atmospheric pressure either by itself or along with the boiled sugar solution. The point of departure for the invention is the realization that it can be of advantage to beat the mass under sub-atmospheric pressure in that the size of the bubbles present subsequent to the beating process is extensively independent of whether the mass is beaten subject to increased pressure, under atmospheric pressure, or under sub-atmospheric pressure. When, on the other hand, the beating occurs under sub-atmospheric pressure, a negative pressure stage ultimately occurs while the confectionery foam is being transferred to the atmosphere and hence in an environment under atmospheric pressure, so that the individual bubbles will contract or be compressed. The volume of the individual bubbles will accordingly be lower. Thus, if the absolute pressure is held constant the size of the bubble is not affected. As soon as the confectionery mass is subjected to a different pressure, the size of the bubbles becomes affected. Accordingly, when the second pressure is larger than the first pressure, the bubbles become smaller. When, on the other hand, the first pressure is larger than the second, the bubbles become larger. During the beating procedure, therefore, the size of the bubbles is unaffected by the absolute pressure. The bubble size becomes first affected by a subsequent pressure, so that the first pressure becomes significant only after a subsequent second pressure is applied, whereby a difference of pressures prevails. Those of skill in the art always consider it necessary in itself for the beating to occur at least under atmospheric pressure and preferably under sub-atmospheric pressure to ensure the availability of enough air or gas to work into the mass. It would accordingly initially appear irrational in consideration of this view on the part of those of skill to eliminate some of the air by employing the sub-atmospheric pressure prior to beating and to allow the sub-atmospheric pressure to exist during the beating process. When, on the other hand, the overall trend of the state of the art is opposed and sub-atmospheric pressure is actually employed during the beating process, another unexpected advantage will be encountered in that a sub-atmospheric pressure treatment can be added immediately after the beating process with no additional engineering expenditure in order to further reduce the residual moisture content of the confectionery foam. Such a reduction is absolutely essential for many products. The transition to a sub-atmospheric pressure treatment of this type in accordance with the invention does not lead to undesirable expansion of the mass in the beater because the mass is already under sub-atmospheric pressure, so that the pressure situation does not essentially change.

It is possible to beat the foaming-promoter solution by itself in a vacuum. It is on the other hand also possible to beat the foaming-promoter solution and the boiled sugar solution together once they have been combined. In the first case the foaming-promoter solution alone is beaten in a vacuum into a preliminary foam that the boiled sugar solution is then added to in the beater. The preliminary foam and the sugar solution are then blended to form the aerated confectionery foam. The advantage of this procedure is that the foaming capacity of the foaming promotor must be exploited to the maximum to avoid scorching and ultimately to conserve it. The preliminary foam and sugar solution can be mixed into the aerated confectionery foam subject to increased pressure, under atmospheric pressure, or in a vacuum. When the mixing occurs in a vacuum, the resulting bubbles will already have contracted at that point, and the vacuum will only be employed to extract the aerated confectionery foam from the beater. This is reasonable whenever the residual moisture content must not be allowed to decrease. It is on the other hand also possible to mix the preliminary foam with the boiled sugar solution in a vacuum and then vacuum-treat the aerated confectionery foam to decrease its moisture content in order to comply with specific applications, in the manufacture of hard nougat for example.

It is, however, also possible to beat the foaming-promoter solution and the boiled sugar solution into the aerated confectionery foam in a vacuum and then vacuum-treat it to decrease its moisture content. In this case the pressure level does not change.

It is also possible to boil the sugar solution in a vacuum in the boiler in order to obtain the same pressure level, specifically a vacuum, in the beater as well while the solution is being transferred into it. The vacuum treatment that follows the beating process is preferably accompanied by heat, which can be provided by way of the double walls of the beater. It also becomes possible to vary the temperature of the foam at this point in the process.

The vacuum treatment that follows the beating can also be carried out at a pressure level that differs from that employed for vacuumized beating. It is in particular possible to carry out the vacuum treatment at a lower absolute residual pressure than the beating in order to get a lower residual moisture content.

The new method makes it possible to generate substantially smaller bubbles in the foam. The bubbles generated when the foam is beaten in a vacuum of 0.5 bars for example are approximately 1/6 as large as those generated when the foam is beaten subject to an increased pressure of 3 bars for example. Even the order of magnitude of the bubbles is accordingly completely different, making it possible to produce completely new or novel products in many cases. Another essential advantage of the new method is that presently known machinery can be employed to carry it out with little modification if any. Care must be taken to ensure that the new method is appropriately controlled or carried out in relation to time. The device known from German Patent 3 528 637 for example is appropriate for carrying out the new method.

BRIEF DESCRIPTION OF THE DRAWING

A preferred embodiment of the invention will now be described in detail with reference to the drawing, which represents a plant that is appropriate for carrying out the invention.

DESCRIPTION OF THE PREFERRED EMBODIMENTS

A boiler 1 can be heated with steam traveling through a line 3 in the direction indicated by arrow 2. The boiler accommodates a mixer 4 that is driven by a motor 5.

Sugar solution 7 is extracted from a tank 6 by a pump 8 and transferred into boiler 1 by way of a line 9 and appropriate valves. Another line 10 recirculates the excess sugar solution 7. Tank 6 also has a mixer 11 driven by a motor 12. A sugar solution 7 is created in tank 6 by preliminarily mixing sugar, sugar substitutes, glucose, and other constituents in water.

Boiler 1 communicates by way of a release valve 13 and a line 14 with a beater 15 that comprises a tank 16 accommodating impellers 17 driven by a motor 18 and transmission 19. The bottom of tank 16 has a double wall 20 that can be filled with steam by way of a line 21 to heat it.

A solution 23 of foaming promotor is prepared in a tank 22, which can also have double walls for heating, mixers 24, and a motor 25. The foaming promotor can be egg white, gelatine, or a similar substance. Other ingredients, an additional sugar solution for example, can also be added at this point. The foaming-promoter solution is transferred by way of a pump 26 and a heated line 27 to a foaming-promoter tank 28, which can accommodate a level transducer 29 that controls pump 26 by way of an electric line 30. Foaming-agent solution 23 can enter beater 15 over a line 31 that accommodates a valve 32. Colorants, flavorings, and similar substances can be added from another tank 33 that communicates with beater 15.

At the bottom of beater 15 or tank 16 is a drainage valve 34 for extracting aerated confectionery foam 35 batch by batch.

A vacuum pump 36 communicates with boiler 1 by way of a line 37 and of a valve 38 accommodated therein. A vapors line 39 with a shut-off valve 40 leads into the atmosphere. The inside of boiler 1 communicates with a line 41 that accommodates a valve 42 and supplies atmospheric or increased pressure for transferring the boiled sugar solution 7 from boiler 1 to beater 15.

Vacuum pump 36 communicates by way of a line 43 that accommodates a valve 44 with the inside of beater 15.

How the method in accordance with the invention can be carried out with the equipment just described will now be explained.

Sugar solution 7 is prepared in tank 6 by dissolving such ingredients as sugar, glucose syrup, etc. in water and mixing with mixer 11. The requisite amount of sugar solution 7 is transferred into boiler 1 over line 9 by pump 8. The solution is boiled in boiler 1 by supplying steam heating in the direction indicated by arrow 2, whereby, depending on the setting of valves 44, 38, and 40 and optionally on the activation of vacuum pump 36, the solution will be boiled subject to increased pressure, at atmospheric pressure, or in a vacuum. Foaming-promoter solution 23 is simultaneously made available in tank 22 and transferred into foaming-promoter tank 28 by way of line 27, whence the requisite amount arrives in beater 15. Sugar solution 7 remains in boiler 1. A vacuum is now generated in beater 15 by way of line 43 and open valve 44, and foaming-promoter solution 23 is beaten into a preliminary foam in this vacuum. The vacuum can also be present in beater 15 before the introduction of foaming-promoter solution 23 to suction it in.

Once foaming-promoter solution 23 has been beaten into a preliminary foam, release valve 13 is opened and the boiled sugar solution 7 is added to the foam in beater 15 by way of line 14. This can be done for example by establishing atmospheric or increased pressure in boiler 1 by way of line 41, so that the boiled sugar will be suctioned into beater 15 as the result of the difference in pressure due to the vacuum therein. In this context it will do no damage if the vacuum in beater 15 is increased in absolute terms. Although the fine bubbles in the preliminary foam will expand to some extent, it is absolutely possible to close release valve 13 once the boiled sugar solution has been transferred to beater 15 and to restore or even augment the vacuum in the beater by establishing an even lower residual pressure. It is on the other hand also possible to carry out this process at normal pressure or subject to increased pressure. All that is important is to ensure that the preliminary foam at least is beaten in a vacuum. If an increased pressure is established in beater 15, by way of a line 45 and a valve 46 for example, as established in the boiler by way of line 41 and valve 42, the aerated confectionery foam 35 can be extracted immediately after the preliminary foam has been mixed with sugar solution 7. It is, however, also possible to initiate a vacuum treatment in beater 15 once the preliminary foam has been mixed with sugar solution 7 in order to lower the residual moisture content of aerated confectionery foam 35 before it is extracted from beater 15. In this case of course it is recommended to initially continue maintaining the vacuum employed to beat foaming-promoter solution 23 into a preliminary foam and follow it with a vacuum treatment.

In another approach sugar solution 7 and foaming-promoter solution 23 are beaten together in a vacuum in beater 15. The sugar solution 7, boiled in boiler 1 is introduced into beater 15 along with foaming-promoter solution 23. Colorants and flavorings can also be added from tank 33. Impellers 17 beat the combined solutions in a vacuum created by vacuum pump 36 by way of line 43. The bubbles in the resulting aerated confectionery foam 35 are relatively small even before the foam becomes subject to atmospheric pressure. In this approach as well the beaten foam can be subjected to additional vacuum treatment subsequent to being beaten in a vacuum. To decrease the residual moisture content it is practical to heat tank 16 by way of its double wall 20. The vapors are extracted by way of line 43 and vacuum pump 36. Once this vacuum treatment has been carried out, it is practical to extract the foam by way of line 45 by generating an increased pressure in the tank 16 in beater 15, compressing or contracting the bubbles. When aerated confectionery foam 35 expands after traveling through extraction valve 34, the bubbles will enlarge again slightly. Since, on the other hand, the beating was carried out in a vacuum and the bubbles are very fine and small when they first occur, the level of pressure between the vacuum prevailing when they first occur and the atmospheric pressure outside the system is exploited to ultimately decrease the size of the bubbles and distribute them very uniformly. Very fine bubbles of this type are desirable for example in some kinds of chewy candy. It is not especially important for aerated confectionery foam 35 to have an especially low specific gravity, although such foams can be produced with the method in accordance with the invention, depending on the ratio of the amount of sugar solution 7 to that of foaming-promoter solution 23.

I claim:

1. A method for producing an aerated confectionery foam from a sugar solution and a foam-promoting solution batch by batch, comprising the steps: boiling a sugar solution in a boiler and transferring the boiled solution to a beater; adding a foam-promoting solution to said boiled sugar solution in said beater, lowering pressure in said beater to a sub-atmospheric pressure; beating said foam-promoting solution together with the boiled sugar solution into an aerated confectionery foam with small and finely distributed bubbles under said sub-atmospheric pressure; and applying above-atmospheric pressure to said beater for removing said aerated confectionery foam from said beater, pressure during beating said foam-promoting solution together with said boiled sugar solution being higher than the pressure at solidifying of the aerated confectionery foam.

2. A method for producing an aerated confectionery foam from a sugar solution and a foam-promoting solution batch by batch, comprising the steps: beating a foam-promoting solution into a preliminary foam in a beater at sub-atmospheric pressure; boiling a sugar solution in a boiler and adding the boiled solution to said preliminary foam in said beater; mixing said preliminary foam and said sugar solution into an aerated confectionery foam with small and finely distributed bubbles; and applying above-atmospheric pressure to said beater for removing said aerated confectionery foam from said beater, pressure during heating said foam-promoting solution being higher than the pressure at solidifying of the aerated confectionery foam.

3. A method for producing an aerated confectionery foam from a sugar solution and a foam-promoting solution batch by batch, comprising the steps: beating said foam-promoting solution into a preliminary foam in a beater at sub-atmospheric pressure; boiling said sugar solution in a boiler under sub-atmospheric pressure and adding the boiled solution to said preliminary foam in said beater; mixing said preliminary foam and said sugar solution under sub-atmospheric pressure into an aerated confectionery foam with small and finely distributed bubbles; and applying above-atmospheric pressure to said beater for removing said aerated confectionery foam from said beater, pressure during beating said foam-promoting solution being higher than the pressure at solidifying of the aerated confectionery foam; decreasing residual moisture content of said aerated confectionery foam by said confectionery foam at sub-atmospheric pressure; the sub-atmospheric pressure in said step for decreasing residual moisture content being lower than the sub-atmospheric pressure in said beating step.

4. A method as defined in claim 2, wherein said preliminary foam is mixed with said boiled sugar solution at sub-atmospheric pressure; and decreasing residual moisture content of the aerated confectionery foam by treating said aerated confectionery foam at sub-atmospheric pressure.

5. A method as defined in claim 1, including the step of decreasing residual moisture content of said confectionery foam by treating thereafter said confectionery foam under sub-atmospheric pressure.

6. A method as defined in claim 2, wherein said sugar solution is boiled in said boiler under sub-atmospheric pressure.

7. A method as defined in claim 6, including the step of adding heat to the steps carried out at sub-atmospheric pressure.

8. A method as defined in claim 4, wherein said sub-atmospheric pressure in said beating step is higher than the sub-atmospheric pressure for decreasing residual moisture content of said confectionery foam.

* * * * *